(No Model.)

J. LEE.
CULTIVATOR.

No. 418,729. Patented Jan. 7, 1890.

Witnesses:
R. H. Orwig.
M. P. Smith.

Inventor:
Jameson Lee,
By Thomas G. Orwig, Atty.

UNITED STATES PATENT OFFICE.

JAMESON LEE, OF MASSENA, IOWA.

CULTIVATOR.

SPECIFICATION forming part of Letters Patent No. 418,729, dated January 7, 1890.

Application filed April 19, 1889. Serial No. 307,684. (No model.)

*To all whom it may concern:*

Be it known that I, JAMESON LEE, a citizen of the United States of America, and a resident of Massena, in the county of Cass and State of Iowa, have invented a new and useful Improvement in Cultivators, of which the following is a specification.

My improvement relates to the manner of connecting the beams of cultivators with a carriage; and my object is to provide a flexible hitching device that will allow longitudinal play and also vertical and lateral motion.

My invention consists in the construction and combination of pivoted beam-guides with a carriage, and a hitching device connected with the beams and the carriage, as hereinafter set forth, pointed out in my claim, and illustrated in the accompanying drawings, in which—

Figure 1:
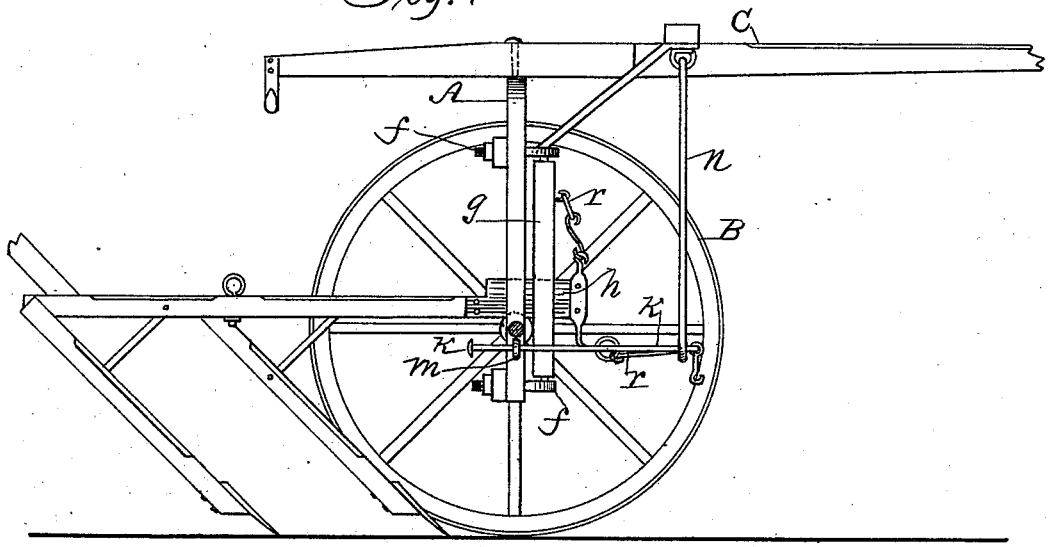
Figure 2:
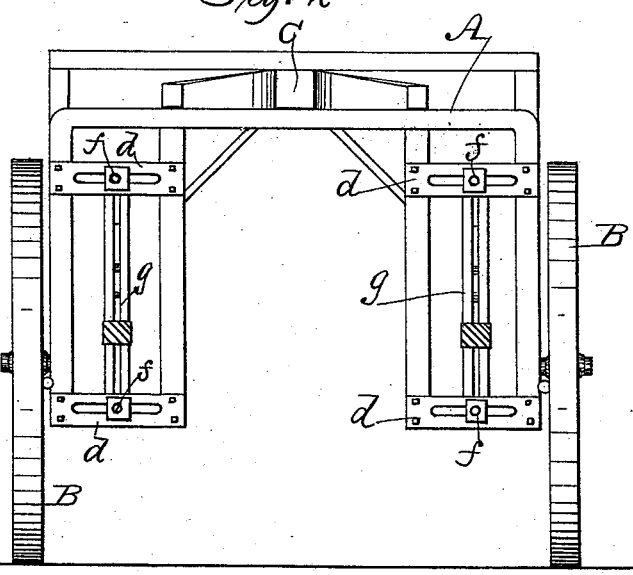

Figure 1 is a side view, and Fig. 2 a rear end view, of a straddle-row cultivator to which my improvement is applied as required for practical use.

A is an arched frame supported upon traction-wheels B in a common way, and C is a pole fixed to the frame.

$d$ are slotted cross-pieces fixed to the opposite sides of the arched frame, and $f$ are eye-bolts extended through the slots and fastened, by means of washers and nuts, in such a manner that they can be adjusted laterally in the slots, as required, to regulate the space between the two beams. These beams are adjustably connected with the frame by means of the eyebolts and the slotted beam-guides $g$, that have journals on their ends extending through and operating in the eyes of the adjustable bolts $f$. Irons $h$, fixed to the front ends of the cultivator-beams, are extended forward through the vertical slots in the guides $g$, in such a manner that the beams will have vertical, lateral, and longitudinal motion when the cultivator is in operation.

$k$ is a draft-rod that has a head on its rear end and a hook on its front end. One of these rods is extended through a fixed ring or bearer $m$ on the side of the arched frame, and flexibly connected at its front end with the pole by means of a pendent swinging bar $n$.

$r$ represents a flexible connection between the front end of the beam and the pendent bar $n$. Each beam is thus flexibly connected with the carriage-pole, so that when horses are hitched to the bars $k$ the draft will be in direct line with the beams and each beam will have independent vertical, lateral, and longitudinal motion.

I am aware that slotted bars have been fixed to a cultivator-carriage and beams connected therewith so that the beams could be raised and lowered and the slotted bars moved laterally to adjust the beams relative to the center of the carriage. I am also aware that the front ends of beams have been connected with flexible hitching devices so that the beams had longitudinal play; but my manner of extending beams through slotted bars adjustably connected with a carriage, and combining them with a pendent flexible hitching device, is novel and greatly advantageous in securing independent lateral, vertical, and longitudinal motion for the beams and cultivators attached to a carriage.

I claim as my invention—

The laterally-adjustable beam-guides $g$, the ends of beams $h$ extended through said guides, the draft-bars $k$, the swinging bars $n$, and the flexible hitching devices $r$, arranged and combined with the carriage of a straddle-row cultivator, substantially as shown and described, for the purposes stated.

JAMESON LEE.

Witnesses:
A. P. LEWIS,
FRANK EVERHART.